(12) United States Patent
Yamada et al.

(10) Patent No.: US 7,553,513 B2
(45) Date of Patent: Jun. 30, 2009

(54) ELECTROCHEMICAL ELECTRODE USING NICKEL-CONTAINING NANOSTRUCTURED MATERIAL HAVING DENDRITIC STRUCTURE AS ACTIVE LAYER, AND METHOD FOR PRODUCING THE SAME

(75) Inventors: Yuka Yamada, Nara (JP); Nobuyasu Suzuki, Nara (JP); Hidehiro Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 570 days.

(21) Appl. No.: 11/500,363

(22) Filed: Aug. 8, 2006

(65) Prior Publication Data
US 2007/0037055 A1    Feb. 15, 2007

Related U.S. Application Data (63) Continuation of application No. PCT/JP2006/305690, filed on Mar. 22, 2006.

(30) Foreign Application Priority Data
May 30, 2005   (JP)   ............................. 2005-156781

(51) Int. Cl.
    H01M 4/00    (2006.01)
(52) U.S. Cl. ..................... 427/128; 427/126.6; 429/233

(58) Field of Classification Search .................. 429/223; 427/126.6, 128
See application file for complete search history.

(56) References Cited

U.S. PATENT DOCUMENTS
2006/0018821 A1   1/2006   Suzuki et al.

FOREIGN PATENT DOCUMENTS

| JP | 3-233863    | 10/1991 |
|----|-------------|---------|
| JP | 10-302808   | 11/1998 |
| JP | 11-54141    | 2/1999  |
| JP | 2000-233130 | 8/2000  |
| JP | 2003-121407 | 4/2003  |
| JP | 2004-286466 | 10/2004 |

OTHER PUBLICATIONS

International Search Report issued in corresponding International Patent Application No. PCT/JP2006/305690, dated Jun. 20, 2006.

*Primary Examiner*—Patrick Ryan
*Assistant Examiner*—Thomas H. Parsons
(74) *Attorney, Agent, or Firm*—McDermott Will & Emery LLP (57) ABSTRACT

The present invention provides an electrochemical electrode wherein transition metal (nickel) nanoparticles are used to form an active layer having a large surface area without using a conductive support while maintaining dispersibility and stability, and a method for producing the same.

8 Claims, 7 Drawing Sheets

Deposition (Directly Supporting)

Fig. 8 ional Appli-
ELECTROCHEMICAL ELECTRODE USING NICKEL-CONTAINING NANOSTRUCTURED MATERIAL HAVING DENDRITIC STRUCTURE AS ACTIVE LAYER, AND METHOD FOR PRODUCING THE SAME

RELATED APPLICATIONS

This application is a continuation of International Application No. PCT/JP2006/305690, filed on Mar. 22, 2006, which in turn claims the benefit of Japanese Application No. 2005-156781, filed on May 30, 2005, the disclosures of which Applications are incorporated by reference herein.

TECHNICAL FIELD

The present invention relates to an electrochemical electrode for use in cells utilizing an oxidation/reduction reaction, sensors, etc. The present invention particularly relates to an electrochemical electrode using a nickel-containing nanostructured material having a dendritic structure as an active layer, and a method for producing the same.

BACKGROUND OF THE INVENTION

In the past, microstructured materials have been obtained by methods of rapidly solidifying composite metal(s), alloy (s), compound(s), etc., whereby most of the obtained microstructured materials have particle sizes of several microns.

In recent years, research has been actively conducted seeking to minimize the particle size, i.e., from the micron to nanometer order. One of the primary characteristics of nanostructures containing such nanoparticles is that a high percentage of atoms exist on the particle boundary (surface), for example, the ratio may reach 40% with nanoparticles having a diameter of 5 nm. Nanostructured materials may have chemical and physical characteristics that differ greatly from those of micro-level materials having the same chemical composition, and nanostructured materials often exhibit more desirable characteristics.

Nanostructured materials, which have a large surface area, are particularly useful for applications in which a chemical reaction mediated by an active center plays a significant role, i.e., catalytic applications. The larger the contact area such materials have with the surroundings (gases, liquids, etc.), the better the catalytic reaction should be. Furthermore, when a transition metal nanostructured material is used as a material having a large surface area, by giving or receiving electrons to or from the reaction material, the transition metal itself is subject to valence change (oxidation/reduction), so that great catalytic activity can be thereby readily obtained. Therefore, there is a clear advantage in forming an active layer for an electrochemical electrode having catalytic activity from a transition metal nanostructured material.

Examples of known transition metals that can be used as an active layer of an electrochemical electrode include nickel, manganese, etc. For example, Patent Document 1 discloses a fuel cell electrode in which nickel nanoparticles supported on carbon particles are used as an electrode material.

Patent Document 2 discloses a zinc air battery, wherein a micron-level powder mixture of trimanganese tetroxide and manganese dioxide is used as an oxygen reduction electrode. The invention of Patent Document 2 aims to improve the stability and catalytic activity of the oxygen reduction electrode by increasing the efficiency of electron transfer (oxidation/reduction) by using a plurality of manganese oxides having different valences in combination.

An example of a method for making a transition metal into nanoparticles includes, when nickel-nanoparticles disclosed in Patent Document 1 are used, nickel hydroxide, which is more stable than nickel, is made into nanoparticles, supported on a carrier, and then reduced to nickel.

In addition to the Patent Documents mentioned above, Patent Documents 3 to 4 below are relevant to the present invention.

[Patent Document 1] Japanese Unexamined Patent Publication No. 2000-223130 (page 6, FIG. 1)
[Patent Document 2] Japanese Unexamined Patent Publication No. 10-302808 (page 8, FIG. 2)
[Patent Document 3] WO No. 2005/019109
[Patent Document 4] Japanese Unexamined Patent Publication No. 2004-286466

SUMMARY OF THE INVENTION

[Problem to be Solved by the Invention]

However, such transition metal nanoparticles are easily agglomerated. Therefore, in order to obtain an active layer having a large surface area by using transition metal nanoparticles, it is necessary to support the transition metal nanoparticles on conductive supports and electrically connect the supports while maintaining the dispersibility and stability. However, from the viewpoint of ease of making an active layer into a thin film and improving its formability, it is desirable that the active layer be formed without supporting the transition metal nanoparticles on conductive supports.

The present invention has been accomplished in light of the above problems. In other words, an object of the present invention is to provide an electrochemical electrode wherein transition metal (nickel) nanoparticles are used to form an active layer having a large surface area without using conductive supports while maintaining dispersibility and stability, and a method for producing such an electrochemical electrode.

[Means for Solving the Problem]

In order to achieve the above object, the present inventors conducted extensive research and found that the above object can be achieved when an active layer of an electrochemical electrode is formed of a nickel-containing nanostructured material having a specific nanofine structure. The present invention has been accomplished based on this finding.

In other words, the present invention relates to electrochemical electrodes as below and methods for producing such electrochemical electrodes.

1. A method for producing an electrochemical electrode having a conductive substrate and an active layer formed on the conductive substrate, wherein (1) the active layer includes a nickel-containing nanostructured material having a dendritic structure formed by agglomerating a plurality of primary particles, and (2) each primary particle has a core and a shell surrounding the core wherein the core is formed of a nickel nanocrystal and the shell is formed of a nickel oxide film;

(3) the method for producing such an electrochemical electrode comprising:

Step 1 of obtaining nickel nanocrystal particles,

Step 2 of obtaining primary particles by forming a nickel oxide film on the surface of each nickel nanocrystal particle, and Step 3 of forming a dendritic structure by agglomerating a plurality of the primary particles by depositing the primary particles substantially perpendicular to a conductive substrate.

2. The method of Item 1, wherein a magnetic field is applied substantially perpendicularly to the conductive substrate in Step 3.

3. The method of Item 1, wherein the nickel oxide film is formed on the surface of each nickel nanocrystal particle by subjecting the nickel nanocrystal particles to an oxidation treatment in Step 2.

4. The method of Item 1, wherein the nickel oxide film is formed of nickel monoxide.

5. An electrochemical electrode comprising a conductive substrate and an active layer formed on the conductive substrate, (1) the active layer being formed of a nickel-containing nanostructured material having a dendritic structure formed by agglomerating a plurality of primary particles, and (2) each primary particle comprising a core and a shell covering the core wherein the core is formed of a nickel nanocrystal and the shell is formed of a nickel oxide film.

6. The electrochemical electrode according to Item 5, wherein the nickel-containing nanostructured material is formed by the plurality of primary particles being deposited substantially perpendicularly to the conductive substrate, the adjacent primary particles being electrically connected with one another.

7. The electrochemical electrode according to Item 5, wherein the nickel oxide film is formed of nickel monoxide.

8. The electrochemical electrode according to Item 5, wherein the primary particles have an average particle diameter of not less than 1 nm and not greater than 50 nm.

9. The electrochemical electrode according to Item 5, wherein the shell has an average thickness of not less than 0.5 nm and not greater than 10 nm.

[Effect of the Invention]

The electrochemical electrode of the present invention has an active layer formed of a nickel-containing nanostructured material having a dendritic structure formed by agglomerating nanosized primary particles. Because the primary particles are nanosized and have a dendritic structure, the active layer has a large effective surface area. Because each primary particle has an oxide film on its surface, electrons can be easily transferred between adjacent primary particles and between a primary particle and its surroundings. In a cell reaction, this not only increases the current density but also reduces the reaction overpotential, obtaining a high output voltage. Adjacent primary particles are electrically connected with one another due to the dendritic structure, and therefore charge transfer easily occurs throughout the entire active layer. This makes it possible to form a thin film with highly efficient catalytic ability.

The electrochemical electrode of the present invention can be readily produced by the method of the present invention. The method of the present invention is superior to heretofore-known methods in that a dendritic structure can be formed by agglomerating nanosized primary particles without using conductive supports.

EXPLANATION OF SYMBOLS

401 nanoparticle generation chamber
402 an infrared radiation heater
403 particle size controlling chamber
404 deposition chamber
405, 409 mass flow controller
406, 412 gas exhaustion system
407 Ni target
408 pulsed laser light
410 conductive substrate
411 magnet

BEST MODE FOR CARRYING OUT THE INVENTION

1. Electrochemical Electrode

The electrochemical electrode of the present invention includes a conductive substrate and an active layer formed on the conductive substrate, wherein (1) the active layer is formed of a nickel-containing nanostructured material having a dendritic structure formed by agglomerating a plurality of primary particles, and (2) each primary particle has a core and a shell surrounding the core wherein the core is formed of a nickel nanocrystal and the shell is formed of a nickel oxide film.

Note that "dendrite" is defined as a crystal growth structure wherein crystals branch out so that the branches linearly extend parallel to a specific crystal orientation, i.e., a so-called arborescent crystal. However, the "dendritic structure" of the present specification means an agglomeration having a dendritic "appearance" (i.e., a tree-like appearance). Therefore, the "dendritic structure" of the present specification differs from dendritic crystal growth.

As long as the active layer meets the above requirements, the electrochemical electrode of the present invention may have other components like those used in known electrochemical electrodes. For example, there is no limitation on the conductive substrate and those used in known electrochemical electrodes may be used without modification.

The active layer is formed on a conductive substrate. The active layer, in which a primary particle serves as the minimum constitutional unit, is formed of a nickel-containing nanostructured material having a dendritic structure formed by agglomerating a plurality of primary particles. More specifically, the active layer has a so-called dendritic structure wherein a plurality of primary particles are deposited (arranged) substantially perpendicular to the surface of the conductive substrate (i.e., the surface on which primary particles are deposited), and some of them linearly branch out so as to contact (be electrically connected to) adjacent such arrangements.

The active layer of the present invention is porous due to the dendritic structure, and the primary particles have high dispersibility and stability despite not using a conductive support. In such an active layer, a large effective surface area where the surfaces of the primary particles contact the surroundings is secured, and adjacent primary particles are electrically connected with each other, so that a high catalytic ability (for example, catalytic oxygen reduction ability) is thereby obtained.

Each primary particle has a core and a shell surrounding the core. More specifically, the core is formed of a nickel nanocrystal and the shell is formed of a nickel oxide film.

It is preferable that the nickel nanocrystal forming the core have high crystalinity such that a crystal lattice can clearly be observed.

The oxidation number of the nickel oxide film forming the shell is not limited; however, nickel monoxide is preferable. There is no limitation on the form of the shell as long as it covers the core; however, it is preferable that the shell have a uniform thickness. Because the primary particles have the above-described structure, i.e., a nickel oxide film is formed on the surface of a nickel nanocrystal, electron transfer between primary particles or between a primary particle and its surroundings can be easily conducted. Furthermore, the oxide formed on the surface of the nickel nanocrystal contributes to maintain dispersibility and stability of the primary particles.

It is preferable that the primary particles have an average particle diameter of not less than 1 nm and not more than 50 nm, and more preferably not less than 3 nm and not more than 20 nm.

It is preferable that the average thickness of the shell is not less than 0.5 nm and not more than 10 nm, and more preferably not less than 1 nm and not more than 5 nm.

The average height of the active layer (the average length of the deposited primary particles in the deposition direction in a dendritic structure) is not limited, but is preferably not less than 0.5 µm and not more than 50 µm, and more preferably not less than 1 µm and not more than 20 µm. The active layer of the present invention can be formed without supporting primary particles on a conductive support, and therefore it can be more easily made into a thin film than known kinds that use conductive supports.

The invention is explained in detail with reference to drawings.

Figure 1:
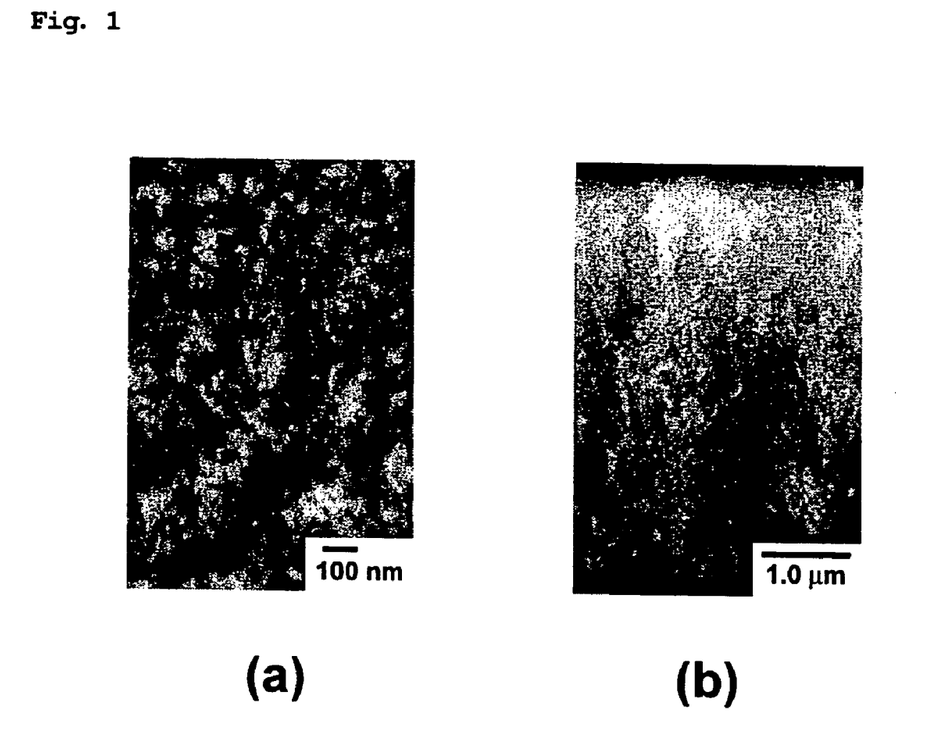
FIG. 1 is images of the active layer of an electrochemical electrode of the present invention taken using a scanning electron microscope (a is an image observed from above, and b is a cross-sectional image observed along the deposition direction of the primary particles).

FIG. 1 is an image of the active layer of an electrochemical electrode of the present invention taken using a scanning electron microscope (a is an image observed from above, and b is a cross-sectional image observed along the deposition direction of the primary particles).

The active layer shown in FIG. 1 has a dendritic structure formed by agglomerating primary particles. Each primary particle has a core formed of a nickel nanocrystal and a shell formed of nickel monoxide.

As is clear from the top view (FIG. 1(a)), primary particles have agglomerated to form a secondary structure of hundreds of nm. As is also clear from the cross-sectional view (FIG. 1(b)), the primary particles are oriented substantially perpendicular to the conductive substrate to form a dendritic structure having a height of about 5 µm. The dendritic structure is porous and some of the substantially perpendicular arrangements linearly branch out so as to contact adjacent arrangements, so that a so-called dendritic structure is thus formed. As described above, because the active layer of the present invention is porous and primary particles are well dispersed, excellent catalytic activity can be obtained.

Figure 2:
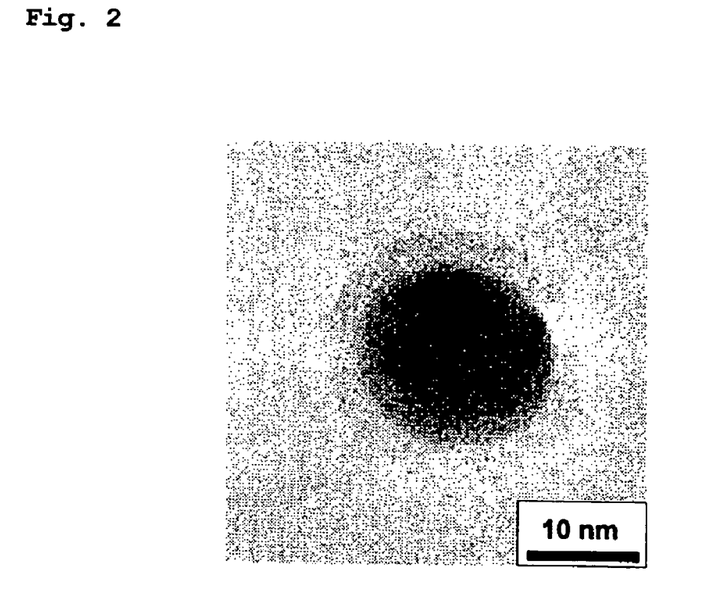
FIG. 2 is an image of a primary particle (having a core and a shell) in an electrochemical electrode of the present invention taken using a transmission electron microscope.

FIG. 2 is an image of a primary particle, which is the minimum constitutional unit of the active layer, taken using a transmission electron microscope. Such a primary particle has a core-formed of a nickel nanocrystal and a shell formed of nickel monoxide.

The crystal lattice of the primary particle shown in FIG. 2 can be clearly observed. It is also clear that the primary particle has a core (monocrystalline) having a particle diameter of about 15 nm and a covering layer (oxide portion) around the core having a thickness of about 2 nm. It is possible to identify that the core is formed of nickel and the shell is formed of a nickel oxide film by, for example, electron diffraction.

2. Method for Producing Electrochemical Electrode

The method of the present invention is for producing an electrochemical electrode having a conductive substrate and an active layer formed on the conductive substrate, wherein (1) the active layer is formed of a nickel-containing nanostructured material having a dendritic structure formed by agglomerating a plurality of primary particles, and (2) each primary particle has a core and a shell surrounding the core wherein the core is formed of a nickel nanocrystal and the shell is formed of a nickel oxide film;

(3) the method for producing such an electrochemical electrode comprising:

Step 1 of obtaining nickel nanocrystal particles,

Step 2 of obtaining primary particles by forming a nickel oxide film on the surface of each nickel nanocrystal particle, and Step 3 of forming a dendritic structure by agglomerating a plurality of the primary particles by depositing the primary particles substantially perpendicular to a conductive substrate.

The conductive substrate, active layer, and primary particles are the same as explained before. In other words, for forming an active layer on a conductive substrate, the method of the present invention is characterized in including Step 1 of obtaining nickel nanocrystal particles; Step 2 of obtaining primary particles by forming a nickel oxide film on the surface of each nickel nanocrystal particle; and Step 3 of obtaining a dendritic structure formed by agglomerating a plurality of the primary particles by depositing the primary particles substantially perpendicular to the conductive substrate. By employing Steps 1 to 3, nanosized primary particles can be stably dispersed without using a conductive support. The thus-obtained active layer is porous due to its dendritic structure formed by agglomerating a plurality of primary particles and has many catalytically active spots.

The method of the present invention is explained in more detail below with reference to drawings.

Figure 3:
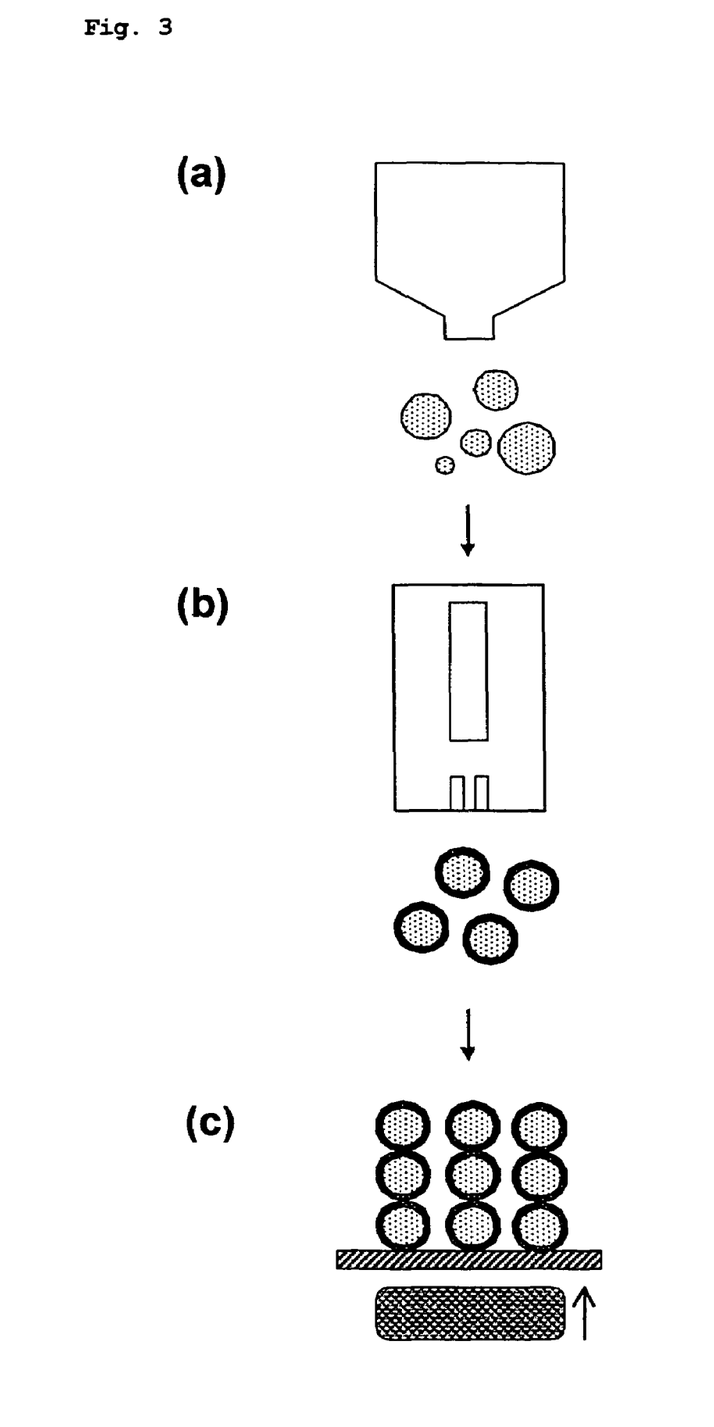
FIG. 3 shows the steps of producing the electrochemical electrode of the present invention (a shows Step 1, b shows Step 2, and c shows Step 3).

FIG. 3 schematically shows Steps 1 to 3, wherein FIG. 3(a) illustrates Step 1, FIG. 3(b) illustrates Step 2, and FIG. 3(c) illustrates Step 3. In particular, FIG. 3(b) illustrates a step of making the particle diameter of nickel nanocrystal particles uniform and forming a nickel oxide film on the surface of each nickel nanocrystal particle so as to obtain primary particles. Primary particles having a uniform diameter with a nickel-oxide film formed on the surface thereof (the solid black portion indicates nickel oxide film) are shown in the bottom of FIG. 3(b).

In the production method of the present invention, it is preferable that the nickel nanocrystal particles obtained in Step 1 be transferred to the subsequent operations together with a carrier gas. By immediately supplying primary particles to subsequent operations without being exposed to the atmosphere, an active layer containing a reduced amount of impurities can be readily formed.

Each step is explained in detail below.

<Step 1>

In Step 1, nickel nanocrystal particles are obtained. For example, monocrystalline nickel nanocrystal particles can be obtained by energizing a solid material (nickel block) to desorb a component material (nickel) and quenching the obtained component material. Specifically, a gas evaporation technique, a laser ablation technique, sputtering, etc., can be employed.

When crystallinity of the nickel nanocrystal particles is unsatisfactory, it is preferable that the nickel nanocrystal particles be further heated. By conducting a heat treatment, crystallinity thereof can be increased. There is no limitation on the treatment conditions, but such a heat treatment may be conducted at 200 to 800° C. using an infrared radiation heater. The atmosphere for conducting heat treatment is not limited, but an Ar, He or like inert gas atmosphere is preferable. The treatment time is also not limited and can be suitably selected depending on the treatment temperature and degree of crystallinity.

<Step 2>

In Step 2, primary particles are obtained by forming a nickel oxide film on the surface of each nickel nanocrystal particle. A preferable method for forming a nickel oxide film on the surface of each nickel nanocrystal particle is, for example, subjecting the surfaces of the nickel nanocrystal particles to oxidation treatment in a vapor phase.

$O_2$, $O_3$, $N_2O$, $NO_2$ and other oxidizing gases can be used for such oxidation treatments. In other words, by contacting the surfaces of the nickel nanocrystal particles with an oxidizing gas, the surfaces of the nickel nanocrystal particles are oxidized, forming nickel oxide films. It is preferable that the nickel oxide film be formed of nickel monoxide.

The thickness of the nickel oxide film can be suitably selected by controlling the flow rate of the oxidizing gas using a mass flow controller, etc. The oxidation treatment can be conducted in a more efficient manner if the oxidizing gas is energized and activated by being irradiated with ultraviolet rays, electron beams, etc.

Note that the speed of the oxidation treatment depends on the size of nickel nanocrystal particles. Therefore, it is preferable that the size of the nickel nanocrystal particles be classified before conducting Step 2. For example, the particle diameters can be classified by using a differential mobility analyzer, mass spectroscopy, etc.

<Step 3>

In Step 3, a dendritic structure formed by agglomerating primary particles is obtained by depositing the primary particles substantially perpendicular to the conductive substrate.

In order to deposit the primary particles substantially perpendicular to the conductive substrate, it is important that the deposition direction has directivity. An example of such a method is that primary particles are made into an aerosol jet by being passed through a slit and then deposited on the conductive substrate substantially perpendicular thereto. In this method, it is preferable that a magnetic field that is substantially perpendicular to the conductive substrate be applied around the conductive substrate by providing a magnet or other magnetic field sources at the back surface of the conductive substrate, etc. In this case, because the primary particles contain nickel (a magnetic material), the deposition direction can be easily made substantially perpendicular to the conductive substrate. This method also achieves easy control of the dendritic structure.

Embodiment 1

One method for producing the electrochemical electrode of the present invention is explained in detail below. Embodiment 1 is explained with reference to FIG. 4. Referential number 401 in FIG. 4 indicates a nanoparticle generation chamber, 402 indicates an infrared radiation furnace, 403 indicates a particle size controlling chamber, and 404 indicates a deposition chamber.

In Embodiment 1, the nickel nanocrystal particles obtained in Step 1 are immediately carried to the subsequent operations using a carrier gas without being exposed to the atmosphere.

Figure 4:
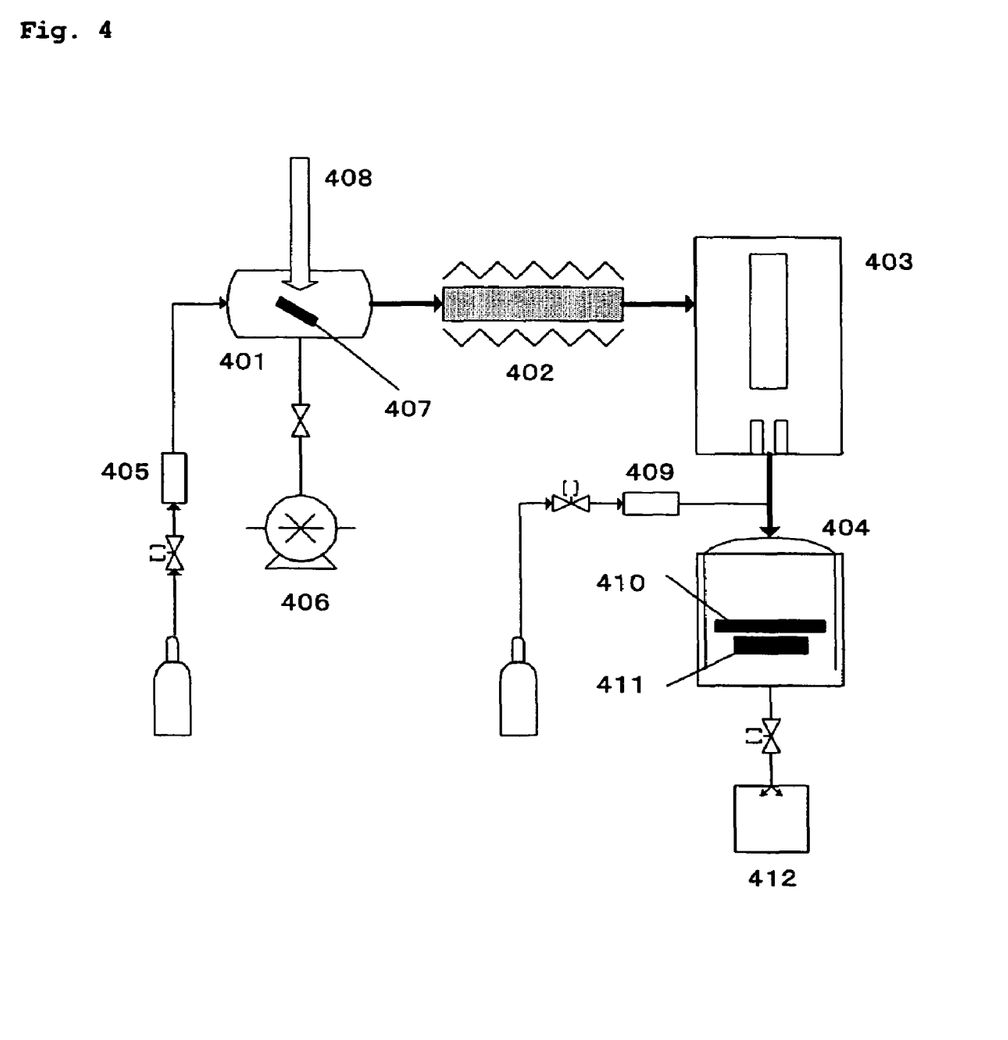
FIG. 4 shows a production flow of the electrochemical electrode of the present invention (in particular, the production flow of the active layer).

Embodiment 1 is schematically explained below. Nickel nanocrystal particles are obtained in the nanoparticle generation chamber 401. Subsequently, the nickel nanocrystal particles are made into monocrystals by being subjected to a heat treatment in the infrared radiation furnace 402 while being transferred using a carrier gas (He), and the particle diameters of the monocrystals are then made uniform in the particle size controlling chamber 403. A nickel oxide film is formed on the surface of each nickel nanocrystal particle (i.e., obtaining primary particles) by introducing oxidizing gas ($O_2$ gas). Thereafter, an active layer is formed by depositing the primary particles on the conductive substrate in the deposition chamber 404.

Each step is explained in detail below.

<Step 1>

Nickel nanocrystal particles are formed by a laser ablation method. The laser ablation method is such that the surface of a target is melted and desorbed by irradiating the target with laser light having a high energy density (pulse energy of not less than 1.0 J/cm$^2$).

First, the nanoparticle generation chamber 401 is evacuated to an ultimate vacuum of about $10^{-4}$ Pa. Subsequently, He gas is introduced to the nanoparticle generation chamber 401 at a specific rate (about 0.5 SLM) via a mass flow controller 405. Here, by conducting gas introduction in accordance with the operation of the gas exhaust system 406 having a scroll pump or a helical groove pump as a main component, it is possible to bring the pressure of the He gas in the nanoparticle generation chamber 401 to within the range of from about 100 to about 1000 Pa.

The atmosphere is not limited to He, and Ar, Kr, Xe, $N_2$ and/or other inert gases may be used. When an inert gas other than He is used, all that is necessary is to control the pressure of the atmosphere so as to be the same as that of He gas. For example, when Ar (density of 1.78 g/l) is used, its pressure should be set to about 0.1 that of He (density of 0.18 g/l).

The surface of the Ni target 407 placed in the nanoparticle generation chamber 401 is irradiated with pulsed laser light 408 under the above-described conditions.

Here, the second-harmonic Nd:YAG laser (wavelength: 532 nm) is used. At this time, a laser ablation phenomenon occurs at the surface of the Ni target, and ions and neutral particles (atoms, molecules, clusters, etc.) of nickel are desorbed, and emitted mainly in a direction along the normal line of the target while maintaining molecular- or cluster-level dimensions.

The emitted desorbed materials collide with atoms in the atmosphere, and therefore their heading directions become disorderly and their kinetic energy dissipates in the atmosphere and their association and aggregation in the gas phase is accelerated. Nickel nanocrystal particles are obtained by the above operations.

When nickel nanocrystal particles are produced by the above method, some nickel nanocrystal particles may have unsatisfactory crystallinity. Therefore, in order to advance the monocrystallization, the particles formed in the nanoparticle generation chamber 401 are subjected to heat treatment at 200 to 800° C. when they pass through a quartz tube in the infrared radiation furnace 402 while being transferred by He gas.

<Step 2>

The nickel nanocrystal particles are further transferred by He gas and subjected to classification in the particle size controlling chamber 403, so that particles having a diameter of about 1 to 50 nm are selected. Known differential mobility analyzers, etc., may be used as a particle size controller. Such classification should be conducted prior to Step 2.

Subsequently, $O_2$ gas is introduced to the nickel nanocrystal particles before placing them in the deposition chamber 404 at a specific flow rate (about 0.4 SLM) via the mass flow controller 409, forming a nickel oxide film on the surface of each nickel nanocrystal particle. Primary particles are thus obtained.

<Step 3>

A conductive substrate 410 for forming an active layer is provided in the deposition chamber 404.

A magnet 411 is disposed at the back surface of the conductive substrate 410 and a magnetic field is applied substantially perpendicular to the front surface of the conductive substrate 410.

A gas exhaustion system 412 having a scroll pump or a helical groove pump as a main component is connected to the deposition chamber 404, and the flow rate of the carrier gas (He) is controlled by conducting differential pumping.

The primary particles are further transferred together with He gas under the above-described conditions, introduced into the deposition chamber 404 through a slit as an aerosol jet, and thereby deposited on the conductive substrate. Note that the deposition direction is directed to be substantially perpendicular to the conductive substrate by the influence of the magnetic field. In other words, the primary particles are deposited on the conductive substrate 410 substantially perpendicular thereto. Some of the substantially perpendicular arrangements linearly branch out so as to contact adjacent arrangements, forming a so-called dendritic structure.

<FIGS. 1 and 2>

The active layer shown in FIG. 1 can be obtained by setting the conditions in Embodiment 1 as follows:

The pressure of He gas in the nanoparticle generation chamber 401 is set at 1000 Pa. The nickel nanocrystal particles obtained by irradiating laser light for 500 seconds are subjected to heat treatment at 800° C. in the infrared radiation furnace 402 and classification in the particle size controlling chamber 403, obtaining particles having a diameter of 15 nm. The surfaces of the nickel nanocrystal particles are oxidized, and the thus-obtained particles are deposited on the conductive substrate substantially perpendicular thereto.

In the active layer shown in FIG. 1, primary particles are disposed substantially perpendicular to the conductive substrate, and it has a dendritic structure with a height of about 5 μm. As is clear from FIG. 2, the minimum constitutional unit (a primary particle) has a core (nickel monocrystal) having a diameter of about 15 nm, and a NiO thin film surrounding the core having a thickness of about 2 nm.

EXAMPLES

The present invention is explained in detail below with reference to Examples and Comparative Examples.

Example 1

Production of Test Electrode A

Figure 7:
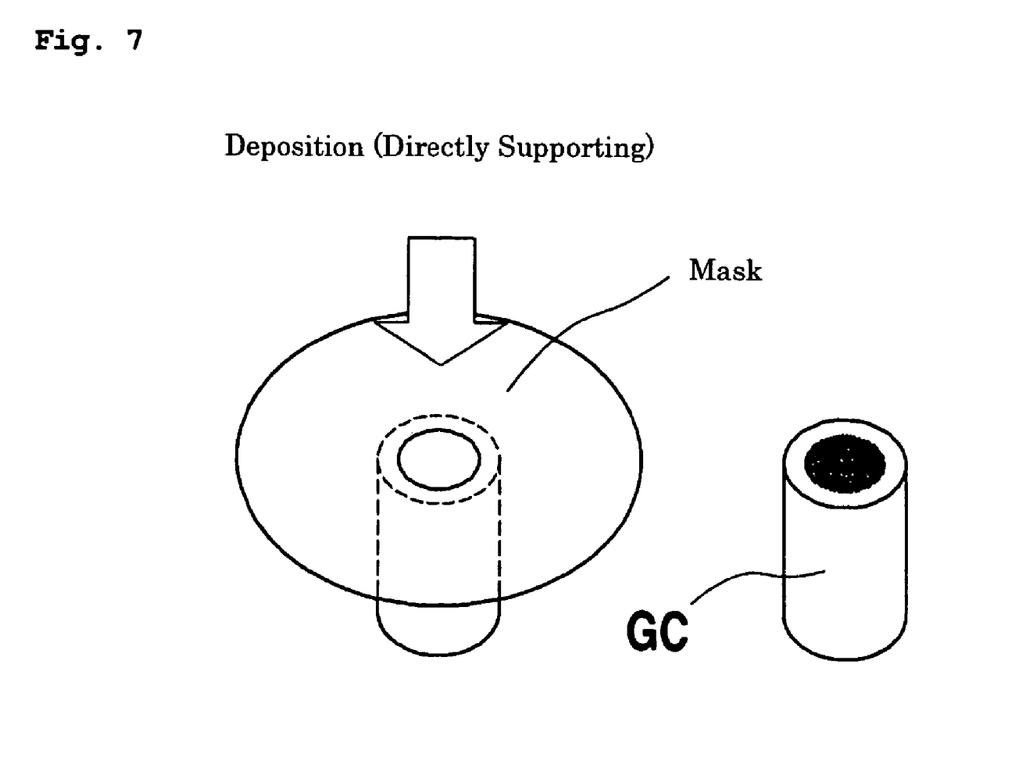
FIG. 7 is a schematic diagram of the mask used in Example 1.

First, a mask having an aperture of 2 mm diameter was placed on a core of a conductive substrate formed of 3 mm diameter glassy carbon (see FIG. 7).

An active layer was formed in the aperture following the conditions for producing an active layer as shown in FIG. 1 described in Embodiment 1. The thus-formed active layer had a height of about 5 μm.

Figure 8:
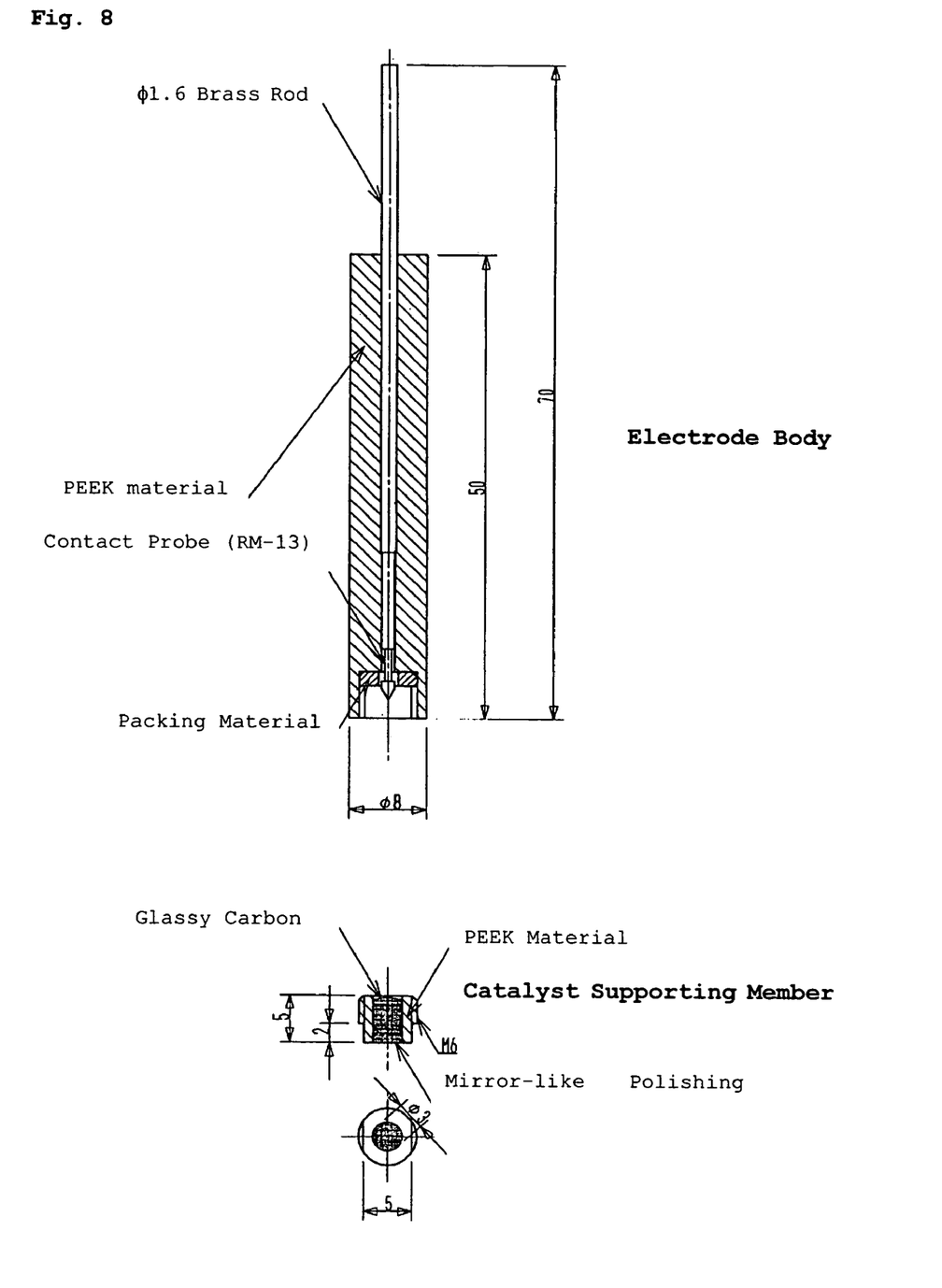
FIG. 8 is a schematic diagram of the electrode used in. Example 1.

The catalyst-supporting member of the test electrode was so structured that a 3 mm diameter glassy carbon subjected to mirror-like polishing was press-fit in a PEEK material having a 6 mm external thread therearound (see FIG. 8).

Second, the catalyst-supporting member having an active layer was tightly placed in the body of the electrode to obtain electric contact, and water repellency attributable to a packing material. Takeout of the electric current from the test electrode was performed through a 1.6 mm diameter brass rod provided in the electrode body (see FIG. 8).

Comparative Example 1

Production of Test Electrode B

A test electrode was produced in the same manner as in Example 1 except that $O_2$ was not introduced. In other words, an active layer was formed by depositing nickel nanocrystal particles on the conductive substrate without forming a nickel oxide film.

Comparative Example 2

Production of Test Electrode C

A test electrode was produced in the same manner as in Example 1 except the magnet 411 was removed and no magnetic field was applied. In other words, an active layer was formed by randomly depositing primary particles on the conductive substrate without restricting the deposition direction thereof.

Figure 6:
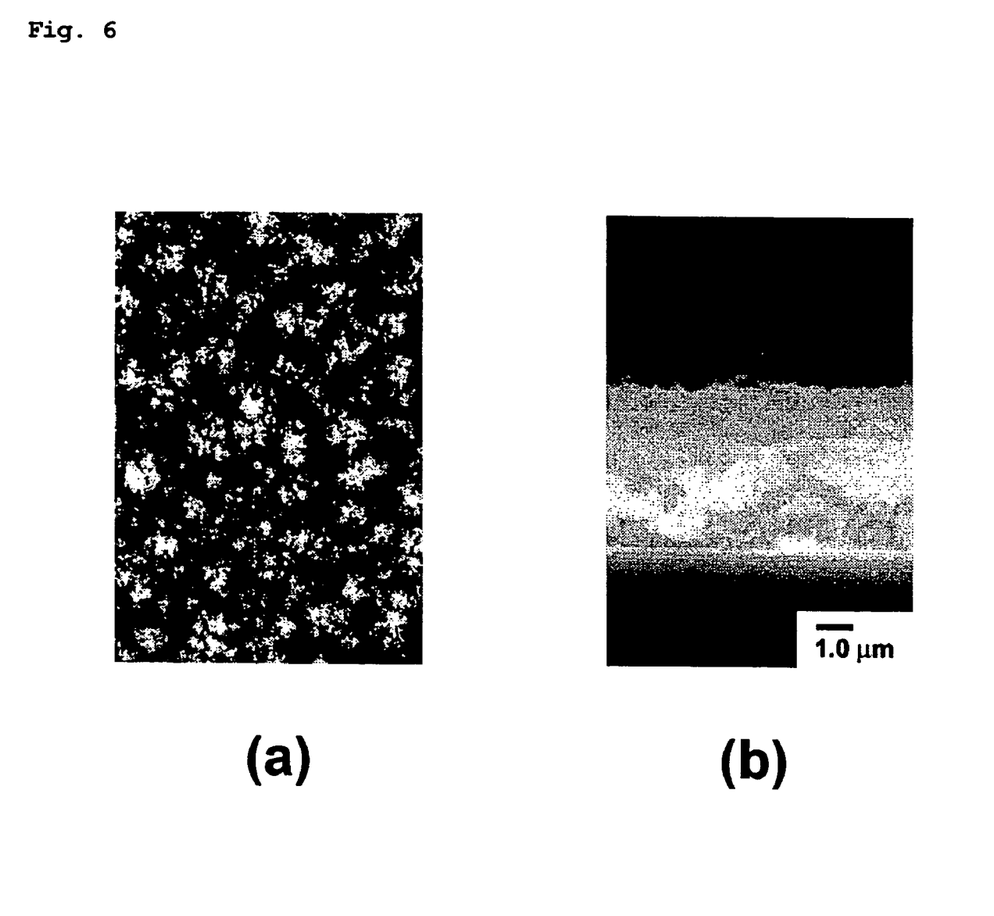
FIG. 6 is images of the active layer of Comparative Example 2 taken using a scanning electron microscope (a is an image observed from above, and b is a cross-sectional image along the height direction of the active layer).

FIG. 6 shows an image of the active layer of test electrode C taken using a scanning electron microscope, wherein FIG. 6(*a*) is a top view and FIG. 6(*b*) is a cross-sectional view seen along the height direction.

Test Example 1

Evaluation of Oxygen Reduction Ability of Test Electrodes

Using the three test electrodes prepared by the above-described method, oxygen reduction catalytic ability was evaluated by cyclic voltammetry method using a three-electrode cell.

Such evaluation was conducted under an oxygen atmosphere, using a test electrode as the working electrode, with saturated dissolved oxygen in an aqueous 0.1 mol/l potassium hydroxide solution (pH 13). Platinum was used as the counter electrode, and silver/silver chloride as the reference electrode. The voltage sweep rate was 0.01 V/second.

Figure 5:
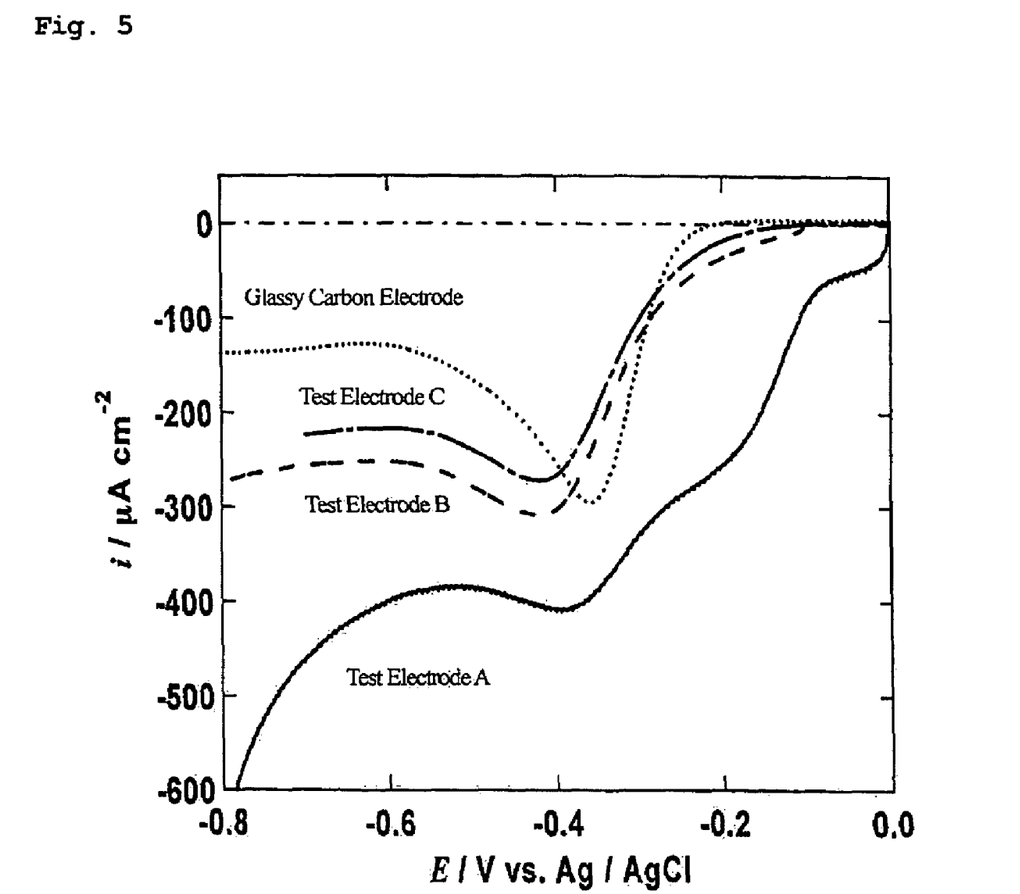
FIG. 5 is cyclic voltammograms measured in Test Example 1.

FIG. 5 shows the cyclic voltammograms.

Test electrode B and test electrode C had an oxygen reduction starting potential (i.e., the potential at which negative current starts flowing when the potential is gradually swept from 0.0 V to negative voltage) of about −0.2 V, which is slightly smaller than that of a glassy carbon electrode without an active layer. However, there was no substantial difference in the oxygen reduction current density, which was −300 μA/cm² even at the peak.

On the other hand, test electrode A exhibited a smaller oxygen reduction starting potential of about −0.1 V, and rapid increase of electrical current. Furthermore, the oxygen reduction current density was also increased.

The presumed reasons that the electrochemical electrode of the present invention exhibits excellent oxygen reduction catalytic abilities are as follows:

By making a transition metal (nickel) into nanometer scaled (nanosized crystalline), the surface area thereof is remarkably increased. Furthermore, by forming an oxide film on the surface of each nickel nanocrystal particle, electron transfer within the active layer and between the active layer and the surroundings can be facilitated and stabilized. Presumably, this accelerates the catalytic reaction.

The active layer of the present invention has a dendritic structure wherein primary particles are electrically connected with each other, and the primary particles have excellent dispersibility and stability. Therefore, despite the extremely thin active layer of about 5 μm, stable oxygen reduction catalytic ability can be achieved.

In particular, the reduced potential at which oxidation/reduction reaction starts indicates that overpotential is also reduced, and therefore when the electrochemical electrode of the present invention is used as a cell electrode, a highly efficient cell with a high output voltage can be obtained.

In evaluating an electrochemical electrode by employing cyclic voltammetry, the overpotential and current density vary depending on the pH of electrolyte and voltage sweep rate. Therefore, the above results are only an example of the electrochemical catalytic ability of the electrochemical electrode of the present invention.

INDUSTRIAL APPLICABILITY

The electrochemical electrode of the present invention exhibits-excellent catalytic activity, and is therefore usable as an electrode for fuel cells, gas sensors, etc. Furthermore, the electrochemical electrode of the present invention can be used in a wide variety of applications as an inexpensive electrochemical electrode for replacing expensive platinum catalyst electrodes.

The invention claimed is:

1. A method for producing an electrochemical electrode comprising a conductive substrate and an active layer formed on the conductive substrate, wherein
   (1) the active layer comprises a nickel-containing nanostructured material having a dendritic structure formed by agglomerating a plurality of primary particles, and
   (2) each primary particle comprises a core and a shell surrounding the core wherein the core is formed of a nickel nanocrystal and the shell is formed of a nickel oxide film;
   (3) the method for producing such an electrochemical electrode comprising:
   Step 1 of obtaining nickel nanocrystal particles,
   Step 2 of obtaining primary particles by forming a nickel oxide film on the surface of each nickel nanocrystal particle, and
   Step 3 of forming a dendritic structure by agglomerating a plurality of the primary particles by depositing the primary particles substantially perpendicular to a conductive substrate,
   wherein a magnetic field is applied substantially perpendicularly to the conductive substrate in Step 3.

2. The method of claim 1, wherein the nickel oxide film is formed on the surface of each nickel nanocrystal particle by subjecting the nickel nanocrystal particles to an oxidation treatment in Step 2.

3. The method of claim 1, wherein the nickel oxide film is formed of nickel monoxide.

4. An electrochemical electrode comprising a conductive substrate and an active layer formed on the conductive substrate,
   (1) the active layer being formed of a nickel-containing nanostructured material having a dendritic structure formed by agglomerating a plurality of primary particles,
   (2) the nickel-containing nanostructured material is formed by the plurality of primary particles being deposited substantially perpendicularly to the conductive substrate, and
   3 each primary particle comprising a core and a shell surrounding the core wherein the core is formed of a nickel nanocrystal and the shell is formed of a nickel oxide film.

5. The electrochemical electrode according to claim 4, wherein the nickel-containing nanostructured material is formed by the adjacent primary particles being electrically connected with one another.

6. The electrochemical electrode according to claim 4, wherein the nickel oxide film is formed of nickel monoxide.

7. The electrochemical electrode according to claim 4, wherein the primary particles have an average particle diameter of not less than 1 nm and not greater than 50 nm.

8. The electrochemical electrode according to claim 4, wherein the shell has an average thickness of not less than 0.5 nm and not greater than 10 nm.

* * * * *

UNITED STATES PATENT AND TRADEMARK OFFICE
CERTIFICATE OF CORRECTION

PATENT NO. : 7,553,513 B2  Page 1 of 1
APPLICATION NO. : 11/500363
DATED : June 30, 2009
INVENTOR(S) : Yuka Yamada et al.

It is certified that error appears in the above-identified patent and that said Letters Patent is hereby corrected as shown below:

IN THE CLAIMS:

In Column 12, Line 37 (Claim 4), change "3 each primary" to --(3) each primary--.

Signed and Sealed this

Third Day of November, 2009

David J. Kappos
*Director of the United States Patent and Trademark Office*